United States Patent [19]

Voorhees

[11] Patent Number: 5,417,505
[45] Date of Patent: May 23, 1995

[54] TONE PATTERN APPLYING INSTRUMENT

[76] Inventor: Scott W. Voorhees, 1308 Devil's Reach Rd., Woodbridge, Va. 22192

[21] Appl. No.: 239,676

[22] Filed: Aug. 2, 1991

Related U.S. Application Data

[63] Continuation-in-part of Ser. No. 321,732, Mar. 10, 1989, Pat. No. 5,098,817.

[51] Int. Cl.⁶ ............................................. B43K 8/20
[52] U.S. Cl. .................................. 401/208; 401/218; 401/219
[58] Field of Search ..................... 401/208, 218, 219; 101/328

[56] References Cited

U.S. PATENT DOCUMENTS

| | | | |
|---|---|---|---|
| 283,583 | 8/1883 | Dorr . | |
| 449,233 | 3/1891 | Porter | 401/208 |
| 519,051 | 5/1894 | Terry | 401/208 |
| 527,049 | 10/1894 | Close | 401/208 X |
| 637,832 | 11/1899 | Rosenberg | 401/208 |
| 1,163,988 | 12/1915 | Epple . | |
| 2,762,072 | 9/1956 | Madalinski | 401/208 |
| 3,003,468 | 10/1961 | Rosenthal | 401/208 |
| 3,103,689 | 9/1963 | Borisof | 401/208 X |
| 3,152,528 | 10/1964 | Pendry | 95/1.7 |
| 3,196,479 | 7/1965 | Romoser | 401/208 |
| 3,402,663 | 9/1968 | Funahashi | 101/327 |
| 3,465,673 | 9/1969 | Oppenheim | 401/208 X |
| 3,646,885 | 3/1972 | Kolody | 401/218 X |
| 3,678,947 | 7/1972 | Ehrlich | 401/198 |
| 3,917,419 | 11/1975 | Kumakurz et al. | 401/218 |
| 3,942,621 | 3/1976 | Karlan | 197/181 |
| 4,045,219 | 8/1977 | Bean | 96/1.2 |
| 4,070,109 | 1/1978 | Ihlenfeld et al. | 355/77 |
| 4,118,122 | 10/1978 | Rees et al. | 355/77 |
| 4,172,419 | 10/1979 | Munyon | 101/379 |
| 4,609,585 | 9/1986 | Seijo | 428/194 |
| 4,632,529 | 12/1986 | Levin | 353/122 |
| 4,667,254 | 5/1987 | Araki et al. | 358/293 |
| 4,670,794 | 6/1987 | Araki et al. | 358/293 |
| 4,723,860 | 2/1988 | Giblin et al. | 401/208 |
| 4,777,510 | 10/1988 | Russel | 355/7 |
| 4,862,217 | 8/1989 | Russel | 355/218 |
| 5,098,817 | 3/1992 | Voorhees | 430/396 |

FOREIGN PATENT DOCUMENTS

| | | |
|---|---|---|
| 273997 | 3/1988 | European Pat. Off. . |
| 2294857 | 7/1976 | France ........................ 101/328 |
| 2415545 | 1/1978 | France ........................ 401/208 |
| 2372701 | 6/1978 | France . |
| 2701694 | 4/1978 | Germany ..................... 401/208 |
| 3615094 | 11/1987 | Germany . |
| 59-38763 | 1/1984 | Japan . |
| 1196169 | 6/1970 | United Kingdom . |

OTHER PUBLICATIONS

Word Perfect workbook/manual, selected pages re "Redline" feature, and generated samples 1988.
Xerox Disclosure Jounral, vol. 1, No. 5, May 1976, p. 77 "Adhesive Overlay", McVeigh, Stamford, U.S.
Photographic Science and Engineering, vol. 18, No. 6, Nov./Dec. 1974, pp. 605–609, Goren et al.-"Document Screens for Extended Range, etc.".
Xerox Disclosure Journal, vol. 8, No. 2, Mar./Apr. 1983, p. 111, "Dipole imaging using white dot screens", Bean, Stamford, U.S.
Xerox Disclosure Journal, vol. 1, No. 5, May 1976, p. 87, "Address Label Printing Device", Goenther, Stamford U.S.

Primary Examiner—Steven A. Bratlie
Attorney, Agent, or Firm—Nixon & Vanderhye

[57] ABSTRACT

An assembly for applying a tone to a document includes an elongated hollow casing, a rotatable print element mounted in the casing with a print applying surface extending outwardly from the casing, and a mechanism to supply the ink to the print element. The print element has tone applying projections, such as dots or lines, extending outwardly from it, and may comprise a roller rotatable about a fixed axis of rotation, a sphere, or an endless belt. Ink is applied to the print element with a piece of foam, or with a bundle of fibers. The foam is positively held in place in the casing with notches and ridges, and may have a wide variety of configurations, especially of the surface associated with the foam that engages the print element.

10 Claims, 10 Drawing Sheets

TONE PATTERN APPLYING INSTRUMENT

CROSS-REFERENCE TO RELATED APPLICATIONS

This application is a continuation in part of Ser. No. 07/321,732, filed Mar. 10, 1989, now U.S. Pat. No. 5,098,817.

BACKGROUND AND SUMMARY OF THE INVENTION

A standard felt-tipped fluorescent highlighter is commonly used to accentuate text or other printed images in letters, reports, books, etc. In its brightly colored, semi-translucent state it is effective in drawing one's attention to a particular area of a page. However, this translucency also limits a highlighters' usefulness as it cannot be 'seen' by the optics of a photocopier and thereby cannot be consistently reproduced. In addition, facsimile technology cannot distinguish standard highlighter markings and thus cannot transmit the highlighted background.

According to the present invention a method, product, and apparatus are provided for effecting highlighting of text, symbols, or the like in documents so that the highlighting reproduces when the document is reproduced electronically (e.g. by photocopying or by facsimile transmission), while not adversely the text after it has been reproduced. This is effectively provided for according to the present invention—in general—by providing a background tone to the text to be highlighted. A background "tone" is typically produced by screening utilizing dots (the dots may be of any geometric configuration) or lines. It is most desirable according to the invention to utilize a tone produced from dots where the dots are small enough and close enough in proximity to one another to appear as a continuous gray tone. The tone is of sufficient density to effectively highlight the text, but does not impair the legibility of the underlined text/symbols. It is most desirable to provide a tone pattern of about 10–22% density (e.g. approximately 20% density), with about 30–65 lines per inch. Such a tone will adequately highlight the text on documents, while being reproduceable utilizing a photocopier or a facsimile transmission, without the highlighted information being obscured.

According to one aspect of the present invention, an assembly for applying a tone to a document is provided which has many features in common with a conventional marker, being just as portable and as readily usable as a conventional marker. The assembly comprises: An elongated hollow casing having a body portion and a removable cap at one end of the body portion; the one end of the body portion also having a projecting portion, and having means defining an opening in the projecting portion. A rotatable print element having tone applying projections extending radially outwardly from the peripheral surface thereof. Means for mounting the print element for rotation and so that a portion of the peripheral surface thereof extends outwardly from the projecting portion of the casing, through the opening therein. And, a piece of foam mounted in the casing and having a surface thereof in engagement with the print element, and extending from the print element into the casing, for applying ink to the tone applying projections on the print element, so that as the print element is moved along a document, a tone pattern is applied to the document.

Preferably the assembly also comprises surface manifestations formed in the casing body near, but spaced from, the print element to positively position the foam in the casing to fix the length of foam between the surface manifestations and the foam surface engaging a print element. The foam is a parallelipiped, and has notches which cooperate with ridges (providing the surface manifestations) in the preferred embodiment. The surface for engaging the print element is at a first end of the parallelipiped, while the second end engages a liquid reservoir. Preferably from the notch to the first end of the parallelipiped the foam is not significantly compressed (just enough to ensure positive transfer of ink to the print element) but between the notch and the second end the foam may be compressed, without affecting the pressure of the foam on the print element.

The foam is typically a plastic microporous open cell construction, for example having 400–1400 pores per inch. The surface for engaging the print element may have a wide variety of configurations. For example it can be a surface of the foam itself that is flat (and parallel to the axis of rotation of the print element), concave, pointed, slit in a plane containing the axis of rotation, or convex. Alternatively, a plurality of short, parallel, nylon or other fibers can be flocked to one end of the parallelipiped and form the surface (acting as a brush) engaging the print element.

Instead of foam, the element engaging the print element for transferring ink to it may comprise a bundle of capillaries (preferably aligned fibers) which form an ink reservoir, being disposed within a tube of ink impervious material. A short length of fibers may extend outwardly from the tube to engage the print element.

It is preferred that the print element comprise a roller mounted for rotation about a fixed axis, with the tone projections on the circumferential periphery thereof. Alternatively, the print element may comprise a sphere, or it may comprise an endless belt having opposed, in line, interior surfaces thereof and each in engagement with a curved surface operatively attached to the casing body. The curved surface may be a stationary, low friction curved surface, or may comprise a roller mounted about a fixed axis of rotation in the casing body.

The assembly/instrument according to the invention not only can be used for applying tone patterns to documents so as to highlight them for facilitating copying by photocopying machines, and transmission by facsimile machines, they also can be used for shading by artists and draftsmen or may be used as novelty drawing instruments by children. Any type of tone projections can be provided, such as dots of any shape, lines, or other geometric elements.

It is the primary object of the present invention to provide an effective tone pattern applying instrument, having a number of uses, including uses in effecting highlighting of documents so that the highlighted portions will reproduce when the document is electronically copied, but will not obscure the portions they highlight. The disclosed invention also relates to other mechanisms, besides the preferred instrument described above, for accomplishing that same purpose. This and other objects of the invention will become clear from an inspection of the detailed description of the invention and from the appended claims.

DETAILED DESCRIPTION OF THE DRAWINGS

Figure 1:
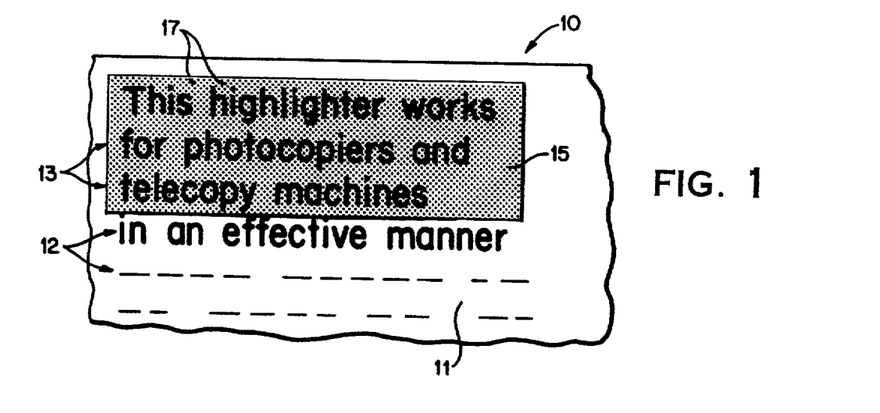
FIG. 1 illustrates a portion of a document, which includes highlighting according to the present invention.

FIG. 1 illustrates a highlighted document 10, such as is produced utilizing a marker according to the present invention. The document comprises a substrate 11, preferably of paper, with words, symbols, or other indicia 12, 13. The indicia 12 is not highlighted, but the indicia 13 is highlighted according to the present invention. This is accomplished by applying a tone 15 over the indicia 13. The tone may be formed utilizing dots (of any shape), lines, other geometric configurations, or the like. For example it may be formed utilizing circular dots 17 which are black and spaced from each other so that they clearly highlight the indicia 13, but are far enough apart so that the underlying indicia 13 is readable. The tone pattern is preferably comparable to screens with about 30–65 lines per inch and with a density of about 10–22% (e.g. about 20%).

Figure 2:
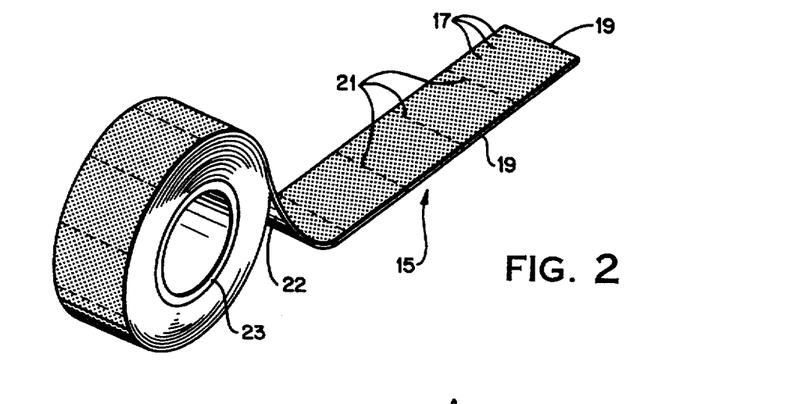
FIG. 2 is a roll of adhesive tape which includes a highlighting tone thereon, such as may be utilized to highlight a document as shown in FIGURE 1.

One way that the tone pattern may be applied is by adhesive tape 15. The adhesive tape 15 comprises an elongated transparent substrate 19 (e.g. plastic ) with the tone dots 17 or the like screened thereon. At predetermined places along the length of the substrate 19 are perforations 21, extending transversely to the dimension of elongation of the substrate 19 (and to the tape edge). An adhesive 22 is applied to one face of the tape 15, and preferably the tape is in the form of a roll 23. The adhesive may be of any conventional type, and may be a permanent adhesive such as is present on conventional pressure sensitive transparent tape, or it may be a readily releasable adhesive so that the tape 15 may be removed after it is applied (e.g. of the type utilized in the 3M "Post It Note" ® products).

Figure 3:
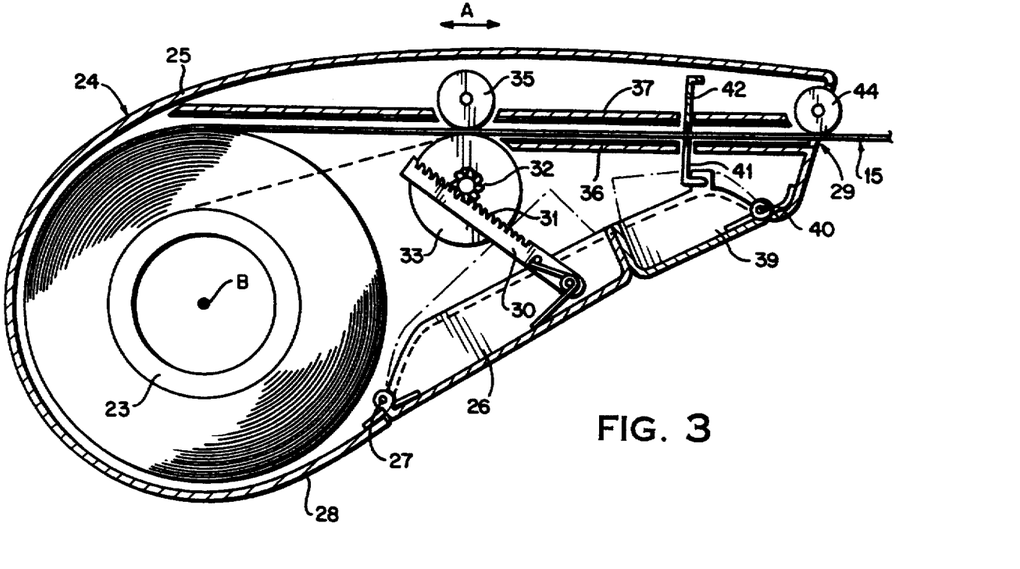
FIG. 3 is a side longitudinal cross-sectional view, partly in elevation, showing an exemplary tape dispenser for dispensing tape of FIG. 2.

If a roll of tape 23 is utilized, preferably it is applied to the areas to be highlighted by tape dispenser 24. If the tape dispenser 24 is utilized perforations 21 are not necessary to effect separation of portions of tape.

The tape dispenser 24 preferably comprises a housing 25 which includes means for mounting the tape roll 23 therein, which means may either be a portion of the housing 25 shaped to mount the roll, or a post for receiving the tape roll 23. The housing 25 is elongated in a dimension of elongation illustrated by arrows A in FIG. 3, and the roll 23 is mounted for rotation about an axis generally perpendicular to the dimension A. The housing 25 may have a trigger 26 mounted therein, for pivotal movement about a pivot pin 27 mounted to the portion 28 of the housing 25 opposite that portion of the roll 23 from which the tape 15 is dispensed. Opposite from the roll 23 in the dimension of elongation A is means defining a tape dispensing opening 29 through which the tape 15 is dispensed.

Figure 4:
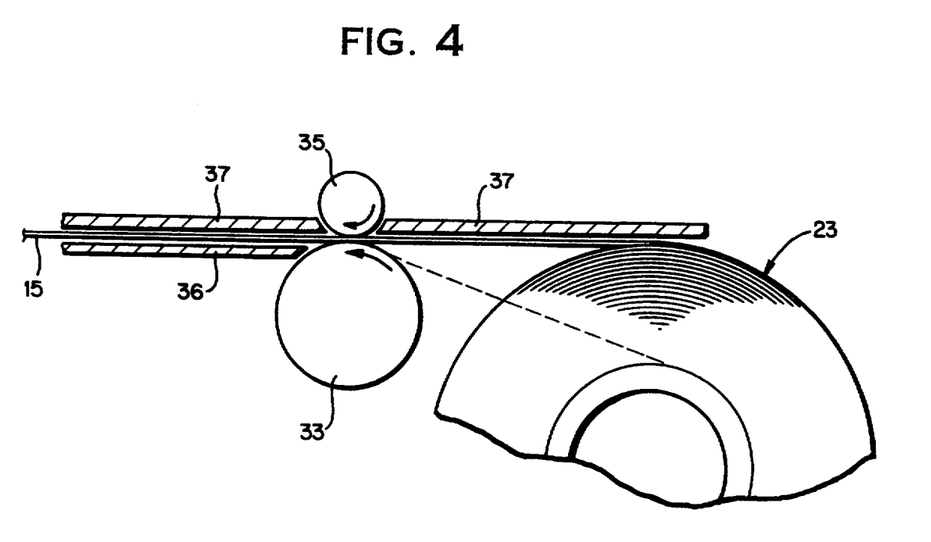
FIG. 4 is a detail view showing the tape driving and guiding components of the dispenser illustrated in FIG. 3.

Connected to the trigger 26 there preferably is a rack 30 which has teeth 31 which engages a pinion 32 connected to a roller 33, the roller 33 comprising a driving roller rotatable about an axis parallel to the axis B. The roller 33 preferably cooperates with a stationary axis driven roller 35 mounted above the tape 15. Means are provided for defining a guide for the movement of the tape 15 from the roll 23 to the tape dispensing opening 29, for example the channel forming members 36, 37. Preferably the inner surfaces of the members 36, 37, and the outer surface of roller 33, are of low friction material (e.g. polytetrafluoroethylene) so that the tape 15 will not stick thereto. The roller 35 is of a frictional rubber material, or the like.

The dispenser 24 also preferably comprises means for severing the tape (if perforated tape is not used). Such means preferably comprises the trigger 39 rotatable about pivot pin 40, with a movable blade 41 mounted thereto and cooperating with a stationary blade 42. The relative movement between the blades 41, 42 caused by depressing the trigger 39 severs the tape 15. Guidance of the tape out of the tape dispensing opening 29 is preferably provided by idler roller 44.

Preferably the tape roll 23 may be inserted into the dispenser 24, and a used roll removed therefrom, merely by removing an entire side of the housing 25. When the side is removed the housing 25 and internal components appear as illustrated in FIG. 3.

Figure 5:
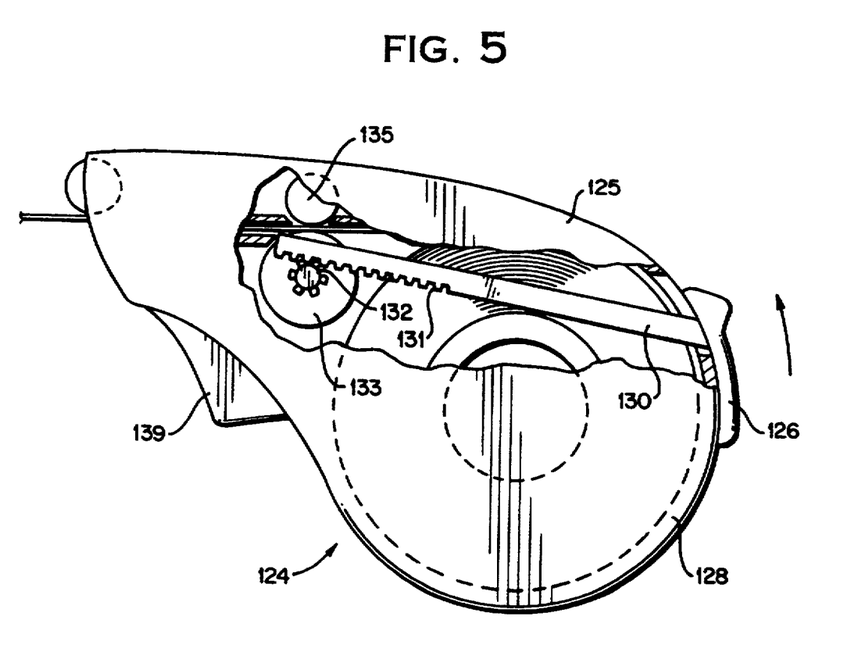
FIG. 5 is a side view, with portions cut away for clarity of illustration, of another exemplary tape dispenser according to the invention.

The tape dispenser may take a variety of other forms too. Another exemplary form of tape dispenser is illustrated generally by reference numeral 124 in FIG. 5. The dispenser of FIG. 5 is like that of FIGS. 3 and 4 except for the mechanism for effecting rotation of the drive wheel. Components of the FIG. 5 embodiment that are identical or similar in function to those of the FIGS. 3 and 4 embodiment are illustrated by the same reference numeral only preceded by a "1".

In FIG. 5, the rack 130 with gear teeth 131 thereon is moved by arcuately moving the actuator 126. The teeth 131 engage pinion 132 on driving roller 133, which cooperates with upper pinch roller 135 to effect driving of the tape 15 within the dispenser. The cutting mechanism is actuated by trigger 139.

Figure 6:
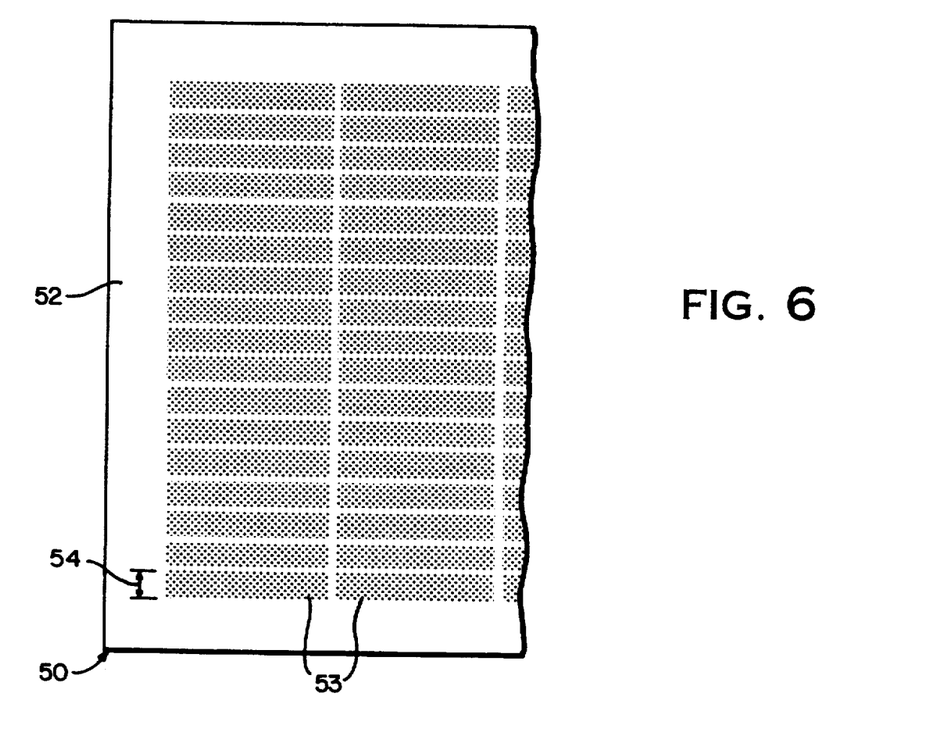
FIGS. 6 and 7 are plan views of portions of exemplary transfer sheets with tones thereon, for applying highlighting as according to the invention.

Another manner in which the tone may be applied is illustrated by the transfer sheet 50 in FIG. 6. The transfer sheet 50 comprises a substrate 52 of conventional transfer sheet material, which will receive ink thereon but then release the ink when it is rubbed. A number of spaced tone areas 53 are disposed on the substrate 52, e.g. screened thereon as by using a dot screen having between about 30–65 lines per inch and a density of between about 10–22%. As seen in FIG. 6 the tone areas 53 are quadrate (e.g. rectangular), and preferably they have a height 54 corresponding to the average height of a line of type (e.g. about one-sixth inch). Simply by rubbing on the surface of the substrate 52 opposite to that to which the ink has been screened, the tone pattern 53 will transfer onto an underlying document, covering one line of type at a time.

Figure 7:
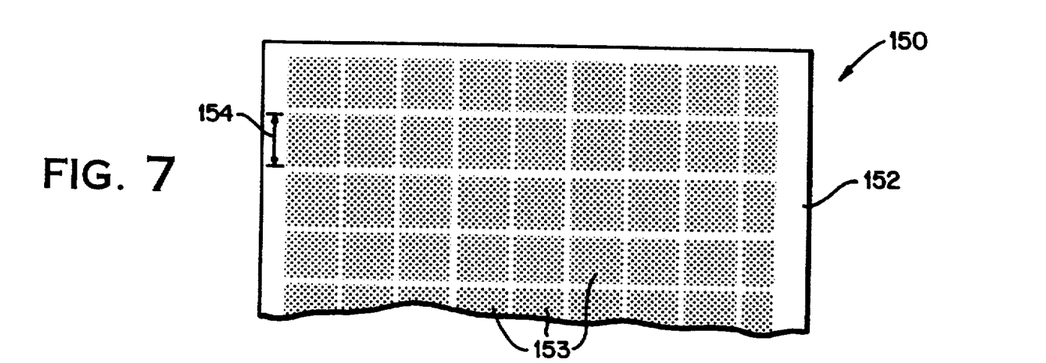

FIG. 7 illustrates a transfer sheet much like that in FIG. 6 except for the arrangement of the tone patterns. Like components in the FIG. 7 embodiment to those in the FIG. 6 embodiment are illustrated by the same reference numeral only preceded by a "1".

The transfer sheet 150 includes a substrate 152 with the quadrate tone areas 153 thereon. In this case the quadrate tone areas 153 are square in shape, and have a height 154 about the height of two lines of type (e.g. ⅓ inch).

Figure 8:
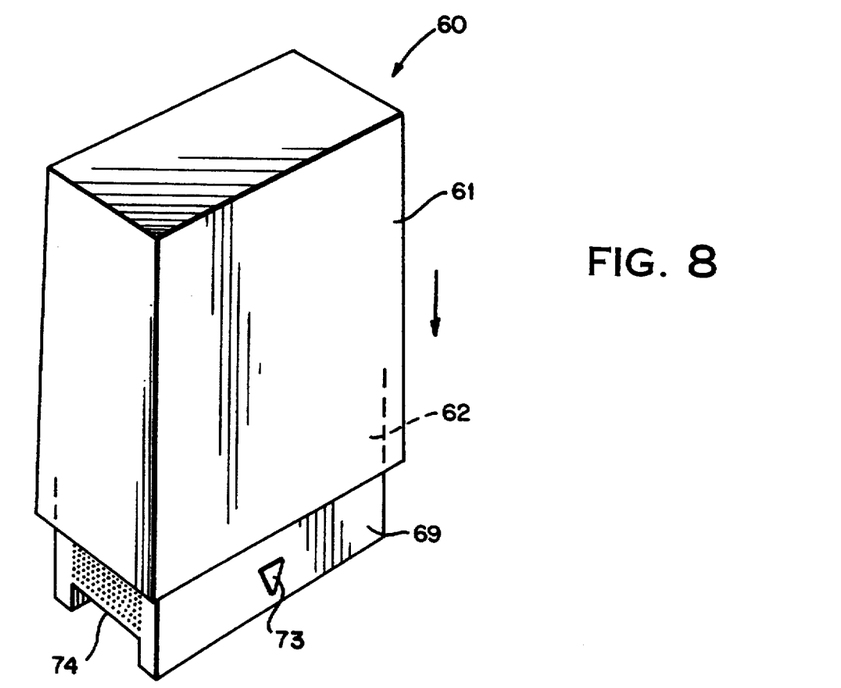
FIG. 8 is a top perspective view of an exemplary tone highlighting device according to the invention for applying ink directly onto document portions to be highlighted.
Figure 9:
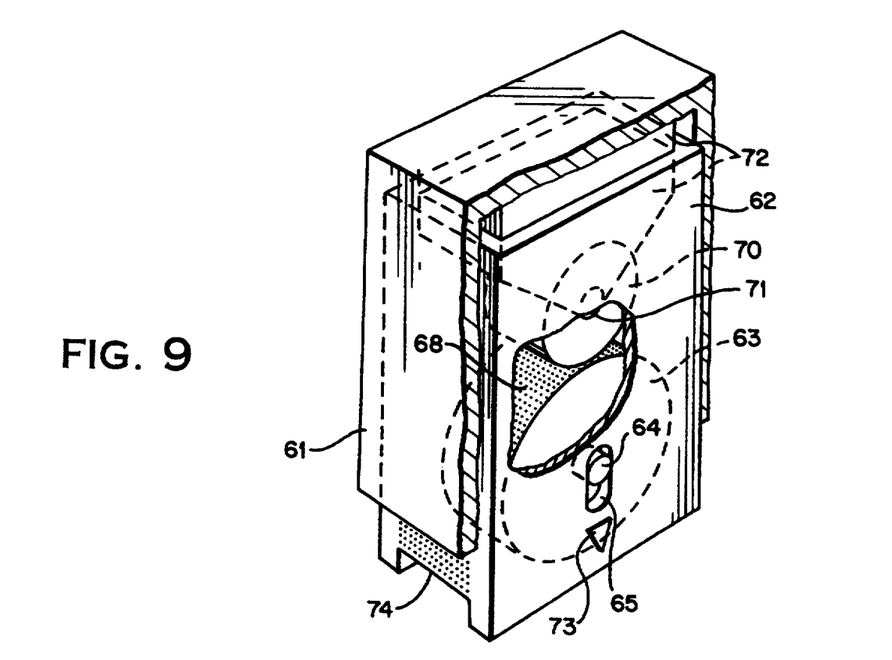
FIG. 9 is a view like that of FIG. 8 only with a portion of the casing cut away to illustrate the internal components for applying the highlighted tone.

Yet another way that the tone can be applied to highlight indicia on a document, according to the invention, is illustrated by the ink applicator 60 in FIGS. 8 and 9.

The applicator 60 comprises an outer housing 61 and an inner housing 62, which are relatively movable with respect to each other. A rolling drum print wheel 63 is mounted for pivotal movement about a horizontal axis by a shaft 64, which is guided by and reciprocal within elongated slot 65 formed in inner housing 62. The shaft 64 is affixed to the interior of the outer housing 61. The print wheel 63 has a plurality of projections 68 extending radially outwardly therefrom which when they are contacted with ink, will transfer the ink onto a substrate that they contact during rolling action of the roller 63. A bottom portion of the inner housing 62 extends outwardly from the outer housing 61 at the bottom, and has an arrow indicia 73 formed thereon to indicate the ink application area of the roller 63, with the cut out end surfaces 74 on the inner housing 62 defining the band that will be highlighted by the roller 63. Preferably the width of the roller 63 is an integer multiple of the height of a line of type (e.g. a multiple of one-sixth inch).

Ink may be applied to the print wheel 63 utilizing the drum wheel 70 rotatable about axis 71, and supplied by ink from a felt pad (not shown) mounted within housing 72. Ink from the felt pad transfers to the drum wheel 70 and then onto the "dot" projection 68 to ultimately be applied to the document substrate.

Figures 10, 11:
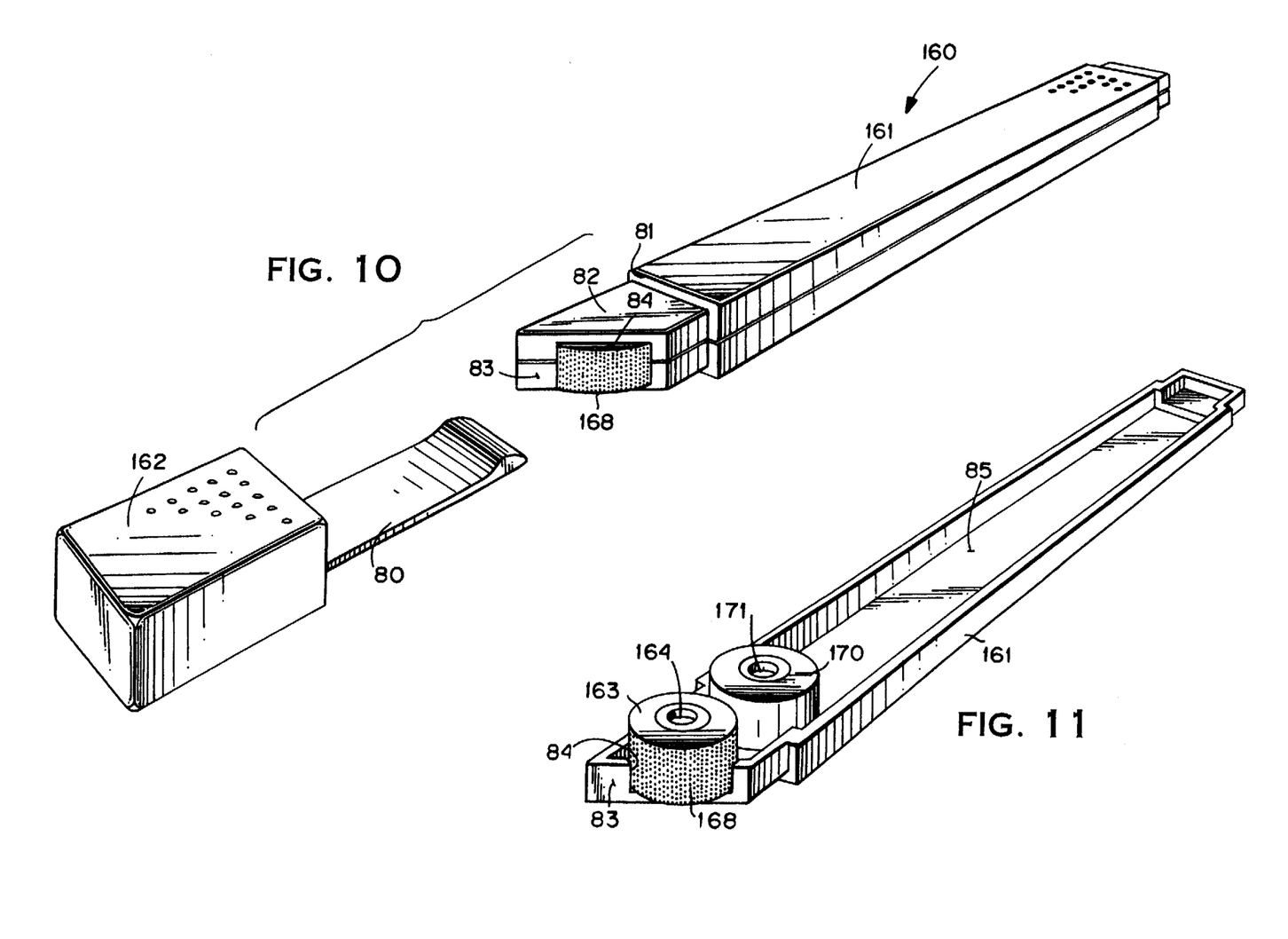
FIG. 10 is a perspective exploded view of another exemplary form of tone applying roller assembly according to the invention.
FIG. 11 is a top perspective view of the bottom half of the body portion of the assembly of FIG. 10.

Another embodiment of a roller assembly for applying a tone to highlight indicia on a document is illustrated in FIGS. 10 and 11. In the FIGS. 10 and 11 embodiment, structures comparable in function to those in the FIGS. 8 and 9 embodiment are indicated by the same reference numeral only preceded by a "1".

In this embodiment, the roller assembly 160 has a main elongated hollow casing having a body portion 161 and a removable cap 162 at one end of the body portion 161. The body portion is designed to look like a conventional highlighter which applies a liquid highlighting medium from a felt tip. At one end of the body 161 a shoulder 81 is provided which cooperates with the removable cap 162, having pocket clip 80, to hold it in place in the closed position. A projecting portion 82 is provided extending outwardly from the shoulder 81 having an angled portion 83 terminating the projecting portion 82, with means defining an opening 84 in the angled portion 83.

A print wheel 163, mounted for rotation about a pivot pin defining an axis 164, has tone applying projections 168 extending radially outwardly from the peripheral surface of print wheel 163. The mounting pin defining axis 164 mounts the print wheel 163 so that a portion of the peripheral portion thereof (with projections 168) extends outwardly from the angled portion 83 of the casing 161, through the opening 84 thereof. A drum wheel 170 is mounted for rotation about an axis 171 defined by a pivot pin, parallel to the axis of rotation 164 of the print wheel 163. As illustrated in FIG. 11, the drum 170 is mounted within the hollow interior 85 of the casing 161, right at the junction of the projecting portion 82, so that the drum wheel 170 may provide somewhat of a seal at that juncture to prevent ink from leaking therepast. Ink may be provided in the hollow casing 85 either in liquid or semi-solid form, or impregnated in a felt material (not shown), so that as the print wheel 163 is moved along a document 10, ink is transferred from the drum wheel 170 to the projections 168, and a tone pattern is applied to the document, as illustrated in FIG. 1.

Figure 12:
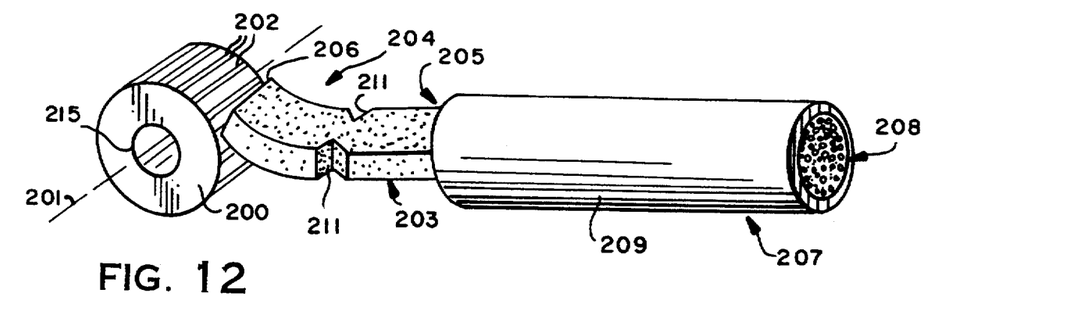
FIG. 12 is a perspective schematic view illustrating a preferred mechanism according to the present invention for applying an ink tone pattern from a reservoir to a roller, which subsequently applies the tone pattern to a document.

As an alternative to utilizing a drum wheel for transferring ink to a print element—as illustrated in FIGS. 8 through 11—the system illustrated in FIG. 12 may be utilized. In this system a wheel or roller 200 is rotatable about a fixed axis 201, and has tone applying projections—such as lines 202—formed on the circumferential periphery thereof. Ink is supplied to the roller 200 circumferential peripheral surface by the piece of foam 203. As illustrated, the foam piece 203 preferably has the configuration of a parallelipiped, and for the preferred size of marker expected to be used commercially, the parallelipiped of foam 203 has a width (a dimension comparable to the dimension of the roller 200 along the axis 201) of about five millimeters, a thickness of about two millimeters, and a length of about 11 millimeters.

The term "foam" as used in the the present specification and claims is intended to encompass all porous plastic or like elements capable of holding ink, yet readily releasing it to the roller projections 202. Preferably, the foam 203 is a microporous open sell foam, having about 400–1400 pores per inch. The foam 203 firmness is about 10–12. It must be firm enough to maintain its configuration and apply a slight pressure against the projections 202, but not so firm as to interfere with the application of ink to the projections 202, or rotation of the roller 200. The individual foam pieces may be constructed by taking a sheet of foam and die cutting it into the pieces—or the foam pieces may be molded to the desired size from moldable porous material.

The parallelipiped piece of foam 203 has a first end 204 closest to the roller 200 and a second end 205. The first end 204 has a surface which will engage the roller 200. In the embodiment illustrated in FIG. 12, that surface is merely a die cut straight and flat edge 206 of the foam 203 itself, which contacts the print wheel 200. The print wheel 200 may be dimensioned so that it is one line of text wide for situations where it is used to highlight text, or a multiple thereof. Where it is used for shading for artists or draftsmen, or as a novelty marker for children or the like, it may have any desired width.

At the second end 205 of the foam piece 203 there preferably is a reservoir of ink. In the embodiment illustrated in FIG. 12 this reservoir—shows generally by reference numeral 207—comprises a relatively rigid element which includes a plurality of capillaries—shown generally by reference numeral 208—which may be nylon or like plastic, which can move ink by capillary action toward the foam 203. The capillary material 208 is disposed within a tube 209 which is ink impervious. The tube 209 may be of ink impervious polypropylene, acetate, or the like, and may be a flexible wrapping around the capillaries 208.

Figure 13:
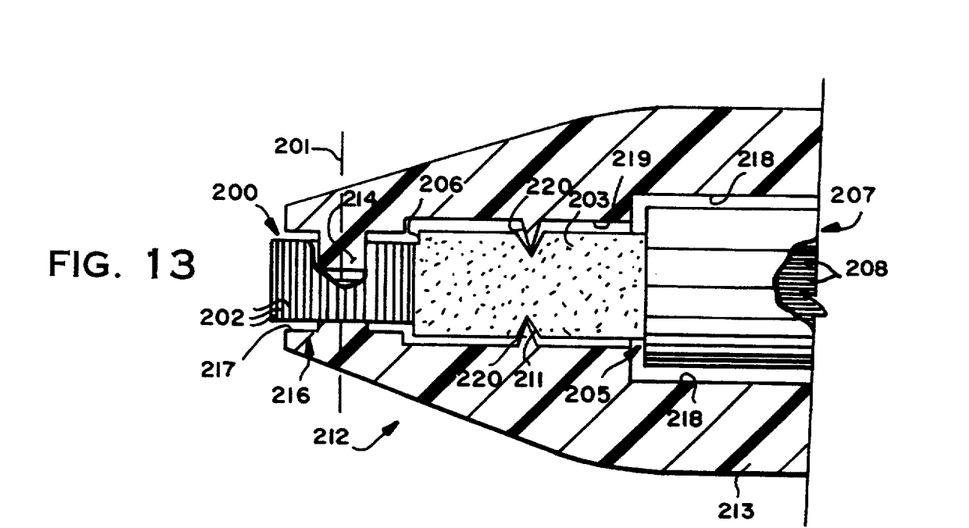
FIG. 13 is a longitudinal cross-sectional view, partly in cross-section and partly in elevation, of the front portion of a marking instrument according to the invention utilizing the components illustrated in FIG. 12.

It is highly desirable to positively locate the foam 203 within a marker so as to provide proper transmission of ink from the reservoir 207 to the printing element 200. For this purpose, the notches 211 may be employed. FIG. 13 shows an exemplary manner in which the components schematically illustrated in FIG. 12 may be mounted within a marker (shown generally by reference numeral 212 in FIG. 13), having a casing body 213 of molded plastic or the like. The roller 200—which also may be a single piece of molded plastic—is mounted for rotation about the axis 201 by a pair of shaft stubs 214 (or inserted pin), one extending from each half of the casing into association with an interior concentric opening 215 (see FIG. 12) of the roller 200. The shaft stubs 214 are located in a projecting first end portion 216 of the marker 212, with the roller peripheral surface (including the tone applying projections 202) extending outwardly through an opening 217 formed in the projection 216.

The hollow casing body 213 includes a main body cavity 218 in which the liquid reservoir 207 is disposed, with an elongated transitional cavity 219 between the projecting portion 216 and the main body cavity 218. The foam 203 is positively positioned within the transition cavity 219, by surface manifestations associated with the casing 213. Preferably the surface manifestations take the form of a pair of projecting ridges 220 which extend into the cavity 219 from the opposite halves of the casing body 213. Each projecting ridge 220 is adapted to be disposed within a location notch 211 of the foam parallelipiped 203, as illustrated in FIG. 13.

The foam parallelipiped 203 is constructed so that the distance between the center of the location notches 211 and the parallelipiped 203 is slightly greater than the distance between the tips of the ridges 220 and the closest circumferential peripheral portion of the roller 200. This provides a slight compression of the foam, to continuously bias the foam into engagement with the roller 200 so that proper transfer of ink from the foam 203 to the projections 202 takes place. The distance from the center of the location notches 211 to the second end 205 of the foam parallelipiped 203 is preferably significantly greater than the distance between the center of the ridges 220 and the nearest end of the reservoir 207. This allows there to be significant compression of the foam parallelipiped 203 between the ridges 220 and reservoir 207 (the reservoir 207 being rigid relative to the foam 203). Because of the compression of the foam 203 to the right of the ridges 220 as viewed in FIG. 13, there will be no affect on the pressure of the foam 203 on the wheel 200, the pressure remaining light but firm.

Figure 14:
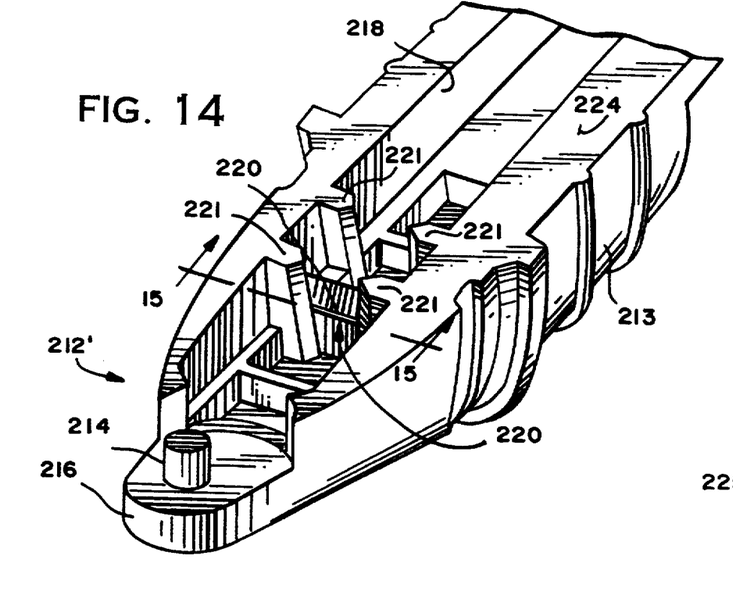
FIG. 14 is a top detail perspective view of the front portion of the body of another embodiment of marking implement utilizable with the components schematically illustrated in FIG. 12, the bottom half of the instrument casing being shown with the top half removed for clarity of illustration.

FIG. 14 shows a marker 212' which is almost identical to the marker 212 except that it defines an axis of rotation of a print wheel that is parallel to the location notches 211 rather than perpendicular (as illustrated in FIG. 13), and two locator ridges 220, which will cooperate with two sets of location notches 211 in a piece of foam, and two sets of ridges 221 hold the foam in place during assembly, and during use hold the foam on the center axis of the wheel. The ridges 220 are located behind and in front of the locator ridges 220.

Figure 15:
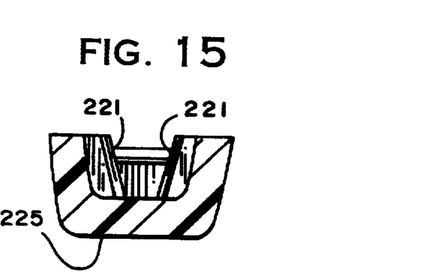
FIG. 15 is a cross-sectional view of the instrument of FIG. 14 taken along lines 15—15 thereof.

FIGS. 14 and 15 illustrate that the casing body 213 is formed in two different halves, each having an open face 224 (that is a face in communication with the cavity 218), and a closed face 225 opposite the open face 224. Note that in this embodiment—as clearly seen in the exaggerated construction of FIG. 15—the ridges 221 slant toward each other from the open face 224 to the closed face 225, to facilitate insertion of the foam into the marker 212, yet ensure positive location thereof.

Figure 16:
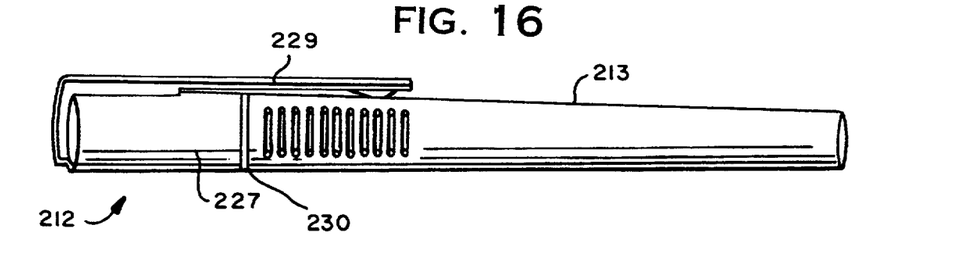
FIG. 16 is a side view of an exemplary preferred marker having interior components such as illustrated in FIGS. 12 through 15.
Figure 17:
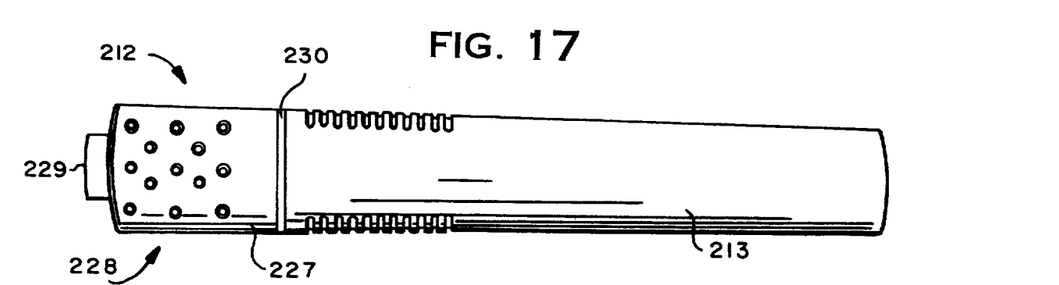
FIG. 17 is a bottom view of the marker of FIG. 16, showing tone pattern indicia thereon.

A marker 212, in complete form, is illustrated in FIGS. 16 and 17. The marker 212—in addition to the casing body 213—also has a removable cap 227, adapted to fit with the body 213, and having interior annular projections adapted to co-act with annular depressions on the body 213 so that the cap 227 snaps into place (as is conventional on commercial markers used for writing). The marker 212 also has a clip 229. The body 213 and cap 227 may be made of polypropylene.

It is also highly desirable, according to the invention, to provide an indication to a user from the exterior of the marker 212 of the particular tone pattern to be applied thereby. For this purpose, indicia means 228—see FIG. 17—are applied to the casing (shown applied to the casing top 227, although they may also—or alternatively—be applied to the casing bottom body 213, or to the clip 229), replicating the tone pattern applied by the tone projections 202 on the wheel 200. The indicia 228—for purposes of illustration only—show a particular dot pattern where dots exist at the corners of squares, and the centers thereof.

The color of ink of the highlighter may be indicated by the color of the band 230 (and/or the clip 229), rather than the color of the highlighter top or body.

Figures 18, 19:
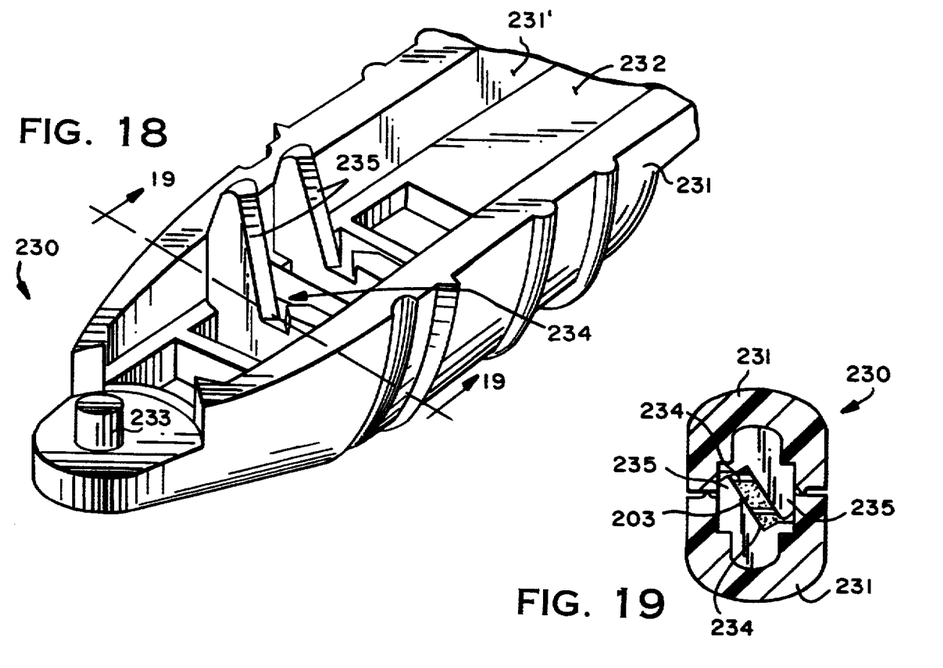
FIG. 18 is a view like that of FIG. 14 for a slightly different embodiment of the marker.
FIG. 19 is a cross-sectional view, taken along lines 19—19 of FIG. 18, of a complete marker casing, with interior mounted foam piece.

FIGS. 18 and 19 illustrate an alternative form of marker 230 which is more easily adaptable to automated assembly processes since it allows the piece of foam to be dropped into place. Also, the construction of the marker 230 is such that if the print wheel 200 has parallel line projections—such as the projections 202 illustrated in FIG. 12—there will be no "flapping" or "washboard" sound as the marker is moved over the document. These results are accomplished in the embodiment illustrated in FIGS. 18 and 19 by providing one or more angled location ridges 234 in each half of the casing body 231, but only against one side wall 231' of the interior cavity. The angled projections 234 extend above the open face 232 of each casing body half 231, however, so that the cooperating projections 234 from the two symmetrical plastic (e.g. ABS) halves of the casing body 231 (see FIG. 18) define an interior cavity which receives the foam 203 at a slant with respect to the axis of rotation defined by the shaft stubs 233. The halves are preferably ultrasonically welded together. Of course the piece of foam 203 has location notches which cooperate with the ridges 234, and other ridges 235 also help in assembly and location. Once the piece of foam is automatically dropped into place it is positively held there by the ridges 234, 235. Since the piece of foam 203 is at an angle, if there is a flat surface (206) at the end thereof that flat surface will engage more than one projection line 202 at the same time, so that a "flapping" sound does not occur.

Figure 20:
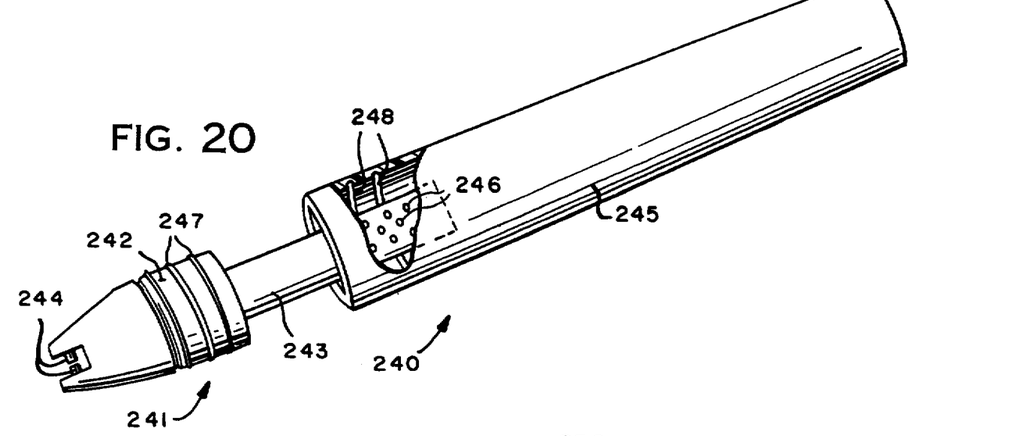
FIG. 20 is a perspective view, with portions of the exterior body casing cut away for clarity of illustration, of a modified form that the casing can take for utilizing the ink applying components of the marker of FIGS. 12 through 15, 18 and 19.

The marker 240 illustrated in FIG. 20 is very similar to the markers 212, 212', 230. The only major difference is that the projecting portion 241 thereof—as well as a transitional portion 242 which contains a transitional cavity and a location ridges for cooperating with the foam location notches, and a trailing piece 243 containing that part of the foam on the opposite side of the location notches as the shaft stubs 244—are contained within a separable insert. The insert is made of weldable plastic (e.g. ABS), and the plastic symmetrical halves of the insert are ultrasonically welded together. The separable insert pieces 243—inserted into the larger hollow body 245—may contain the entire ink supply (e.g. like element 207). However, if a larger ink supply is desired, the large hollow interior casing body 245, may be filled with liquid, the liquid either being free or held within another material such as felt. Some openings—illustrated schematically at 246 in FIG. 20—may be provided in the extension 243 to allow the liquid ink to pass into contact with the foam within the extension 243 through the openings 246. What form the openings 246 take may be greatly varied—for example they may merely be a slight gap formed at a separation line between two halves that operate together to construct the insert. Preferably, conventional annular projections 247 and grooves 248 may be provided on the insert and the casing body 245 to allow a snap action connection between the components to hold them together until the ink within the casing body 245 needs to be replenished.

FIGS. 21 through 27 illustrate a wide variety of different constructions of elements for applying ink to the print element (e.g. print roller) tone applying projections.

Figure 21:
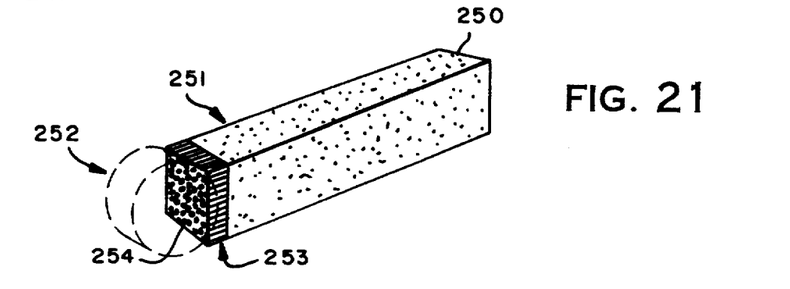
FIGS. 21 through 27 are schematic views illustrating other forms that the foam, or other mechanism, for transferring ink from a reservoir to a print element, may take according to the invention.

FIG. 21 illustrates a piece of foam 250 which has flocked at the end 251 thereof closest to a print roller 252 (shown in dotted line) a plurality of fibers 253. The fibers 253 may be nylon, or like, fibers that will have good wear properties, yet will readily "brush" ink onto the roller 252. The fibers are essentially parallel to each other and aligned in a dimension perpendicular to the axis of rotation 254 of the roller 252.

Figure 22:
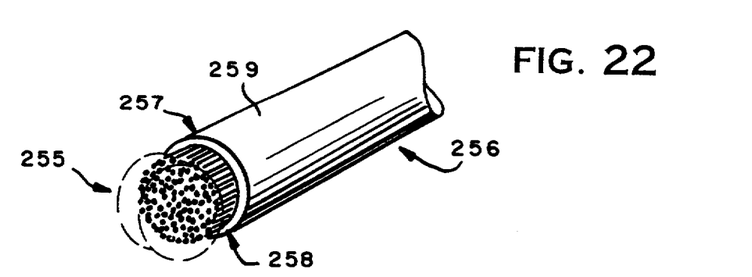

In FIG. 22, ink is transferred directly to the print roller 255 from a reservoir 256. The reservoir is similar to the reservoir 207, except that the capillary fibers extend outwardly from the end 257 of the reservoir 256 closest to the roller 255. Short sections of fibers 258 extend outwardly from the end 257 of the containing tube 259, the fibers 258 acting as a brush for brushing the ink from the reservoir 256 onto the circumferential periphery of the roller 255.

Figure 23:
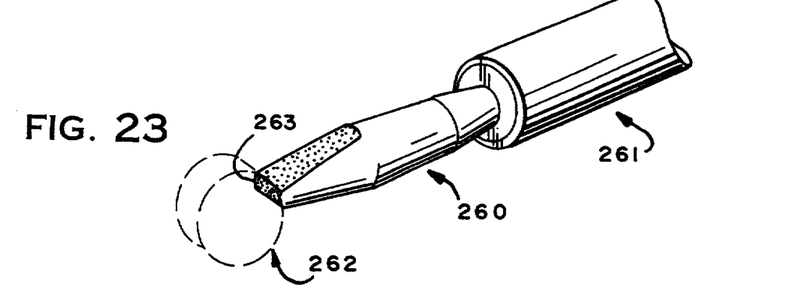

FIG. 23 shows another mechanism 260 for transferring ink from a reservoir 261 to a print wheel 262. A nib of a conventional felt tip pen is extruded to produce small continuous cavities which transport the ink through them. The structure 260 is a version of such a nib that is ground flat to a chisel point 263. The small continuous cavities within the flexible nylon material of the structure 260 transport the ink from the reservoir 261 to the chisel point 263, which then flexibly brushes the ink onto the roller 262 circumferential periphery.

Figure 24:
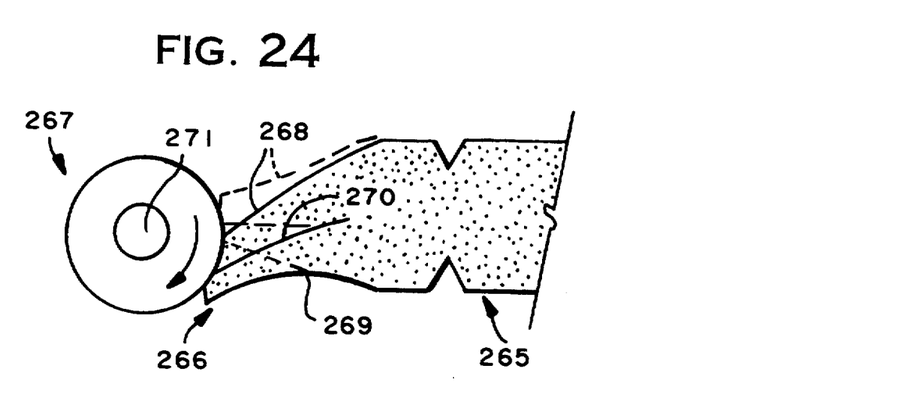

FIG. 24 illustrates an application mechanism which has a slightly different action. In this case, a piece of foam 265 having an end thereof 266 engaging a print wheel 267 is tapered—as illustrated by reference numerals 268, 269—and a split is formed in the truncated tip of the piece of foam 265 adjacent the wheel 267, as illustrated at 270. The split 270 is in a plane which contains the axis of rotation 271 of the roller 267. The split 270 allows the far side of the foam to collect excessive amounts of ink deposited by the near side, which occurs since the near side of the foam is compressed as the roller 267 pushes it out of plane (e.g. the portion of the foam 265 above the split 270 is the air side which is compressed by the rotating roller 267).

Figure 25:
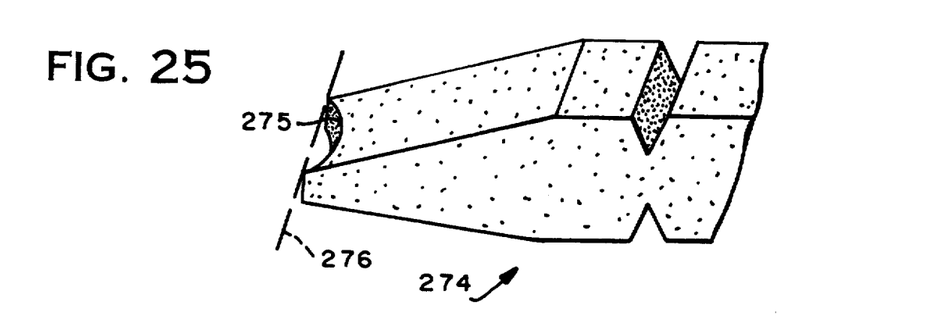

FIG. 25 illustrates as an element for transferring ink to a rotating print element a piece of foam 274 which has a concave surface 275 in the tip thereof adapted to engage the printing element. Such a concave surface 275 is to be avoided when utilizing a roller that is rotatable about an axis parallel to the line 276 illustrated in FIG. 25. However such a concave surface 275 may be desirable if the print element has a different configuration (e.g. a spherical configuration).

Figure 26:
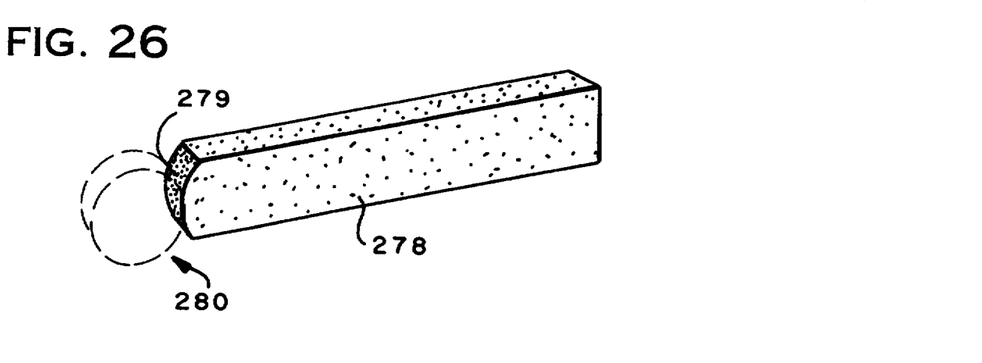
Figure 27:
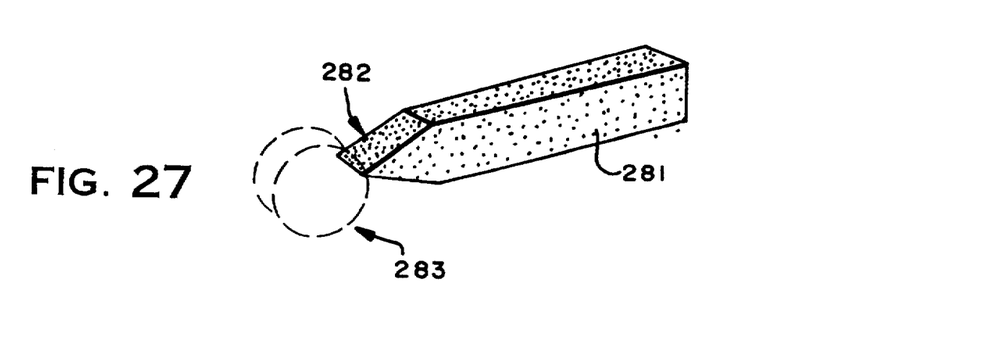

FIG. 26 illustrates another embodiment in which the piece of foam 278 has a curved, convex, end surface 279 which engages the circumferential periphery (containing the tone applying projections) of the roller 280. FIG. 27 illustrates an embodiment in which the piece of foam 281 has been die cut so that it has a generally pointed contact surface 282 which engages the print roller 283 peripheral surface.

Figure 28:
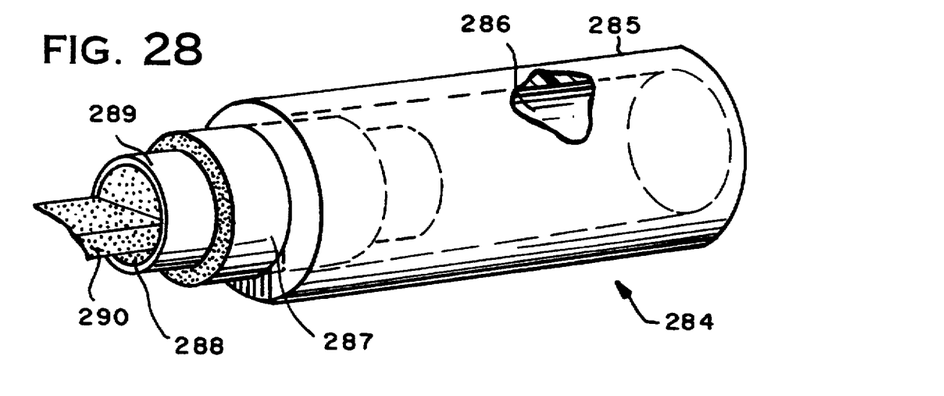
FIG. 28 is a perspective view of an exemplary liquid ink reservoir assembly that may be utilized with a marker such as those of FIGS. 12 through 20.

FIG. 28 illustrates another embodiment at the liquid reservoir according to the invention may take. The liquid reservoir 284 preferably comprises a blow molded (or other molded process) plastic exterior reservoir body 285 that is hollow, and is filled with ink. In the hollow interior 286 thereof, extending outwardly from one end of the reservoir 285, is a sleeve 287 of breathing material. The sleeve 287 communicates between the interior 286 (filled with liquid) and air in the environment and allows air to enter the interior of the reservoir 286 therethrough. For example the breathable material may be a foam, or like structure, having very small pores, too small to allow the ink to flow through them, but large enough to allow air molecules to pass through and enter the reservoir interior 286 when the pressure therein is reduced by ink flowing out of the reservoir 285 through the capillaries 288. The capillaries 288 may be surrounded by the impervious plastic tube 289 or the like, the structures 288, 289 being comparable to the structures 207, 256 earlier illustrated and described. In FIG. 28, the capillary fibers 288 are illustrated directly in contact with a compressed piece of foam 290, to supply liquid ink to the foam 290 which then in turn is supplied to the print element.

Figure 29:
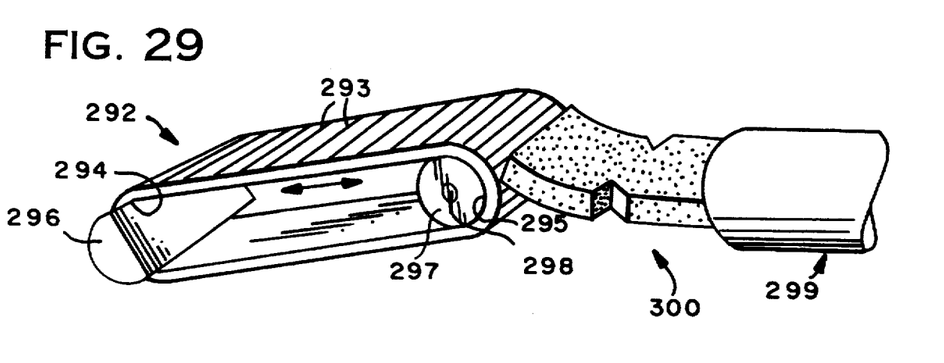
FIG. 29 is a view like that of FIG. 12 only showing an endless belt print element instead of a roller print element, which may be utilized to apply the tone pattern according to the invention.

While a very desirable type of print element is the print roller heretofore described, other print elements may be provided. For example FIG. 29 illustrates an endless plastic flexible belt 292 as the print element. The belt 292 has the tone pattern and applying projections 293 (in the exact embodiment illustrated in FIG. 29 the tone applying projections 293 are lines) to which ink is transferred and from which ink is applied. The belt 292 construction is advantageous in that it allows almost any type of pattern to be applied thereto in a simple fashion (since at times this exterior periphery of the belt 292 is flat), because the belt 292 can be easier to mold than a roller, and may allow the point of the marker to be smaller, improving one's ability to see that which is being printed upon during marking. The belt 292 has curved, in-line interior surfaces 294, 295. Element 296 is a stationary, solid, piece of low friction material, such as polytetrafluoroethylene, or another plastic with a polytetrafluoroethylene coating. While two such elements 296 may be utilized (one in engagement with each of the surfaces 294, 295), instead rollers may be provided, such as the roller 297 illustrated in FIG. 29. The roller 297 is journaled in shaft stubs 298, which are integral with, or otherwise connected to, the casing (not shown) of the marker. As also illustrated in FIG. 29, the liquid ink may be applied from the reservoir 299 to the projections 293 by a piece of foam 300, or other configuration as earlier described.

Figure 30:
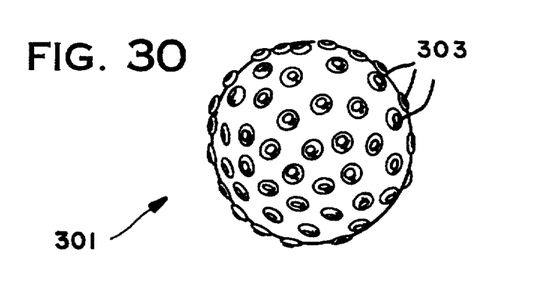
FIGS. 30 and 31 are two embodiments of spheres that may be utilized, in place of the roller of FIG. 12 or the endless belt of FIG. 29, as a print element in the marker assembly according to the invention.
Figure 31:
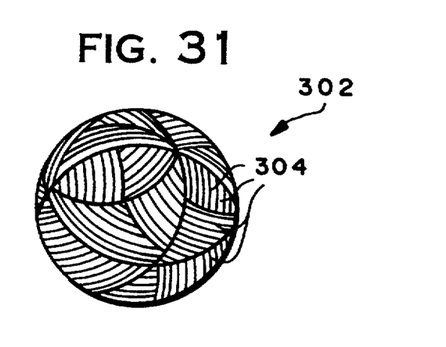

FIGS. 30 and 31 illustrate other configurations of print elements, in the form of spheres 301 and 302. The spheres may have any line, dot, or other icons thereon, to apply a desired pattern, and have the advantage that they allow the marker to be moved in any direction during marking. FIG. 30 illustrates a plurality of dot pattern forming projections 303 extending radially outwardly from all exterior surface portions of the sphere 301, while FIG. 31 illustrates line projections 304 in a variety of orientations, effective to allow proper highlighting, shading, or other marking.

Operation

For the embodiment illustrated in FIG. 2, the length of the area to be highlighted is determined, and then the tape 15 is separated at the appropriate perforation 21 closest to that length. The tape is then applied directly over the indicia 13 (as seen in FIG. 1) to highlight tile indicia 13, while the indicia 13 is still readable. The document 10 is then electronically copied, as by a photocopier or transmission by facsimile machine, the highlighting 15, 17 also appearing on the electronically copied document while allowing the words and/or symbols comprising the indicia 13 to be clearly legible on such a copy. If adhesive 22 on the tape 15 is a releasable adhesive, then the tape 15 is removed from the original after copying.

Utilizing the embodiment illustrated in FIGURES 3 and 4, the trigger 26 is depressed which causes the gear teeth to rotate the gear 32, in turn driving the tape 15 from the roll 23 to the opening 29 by interaction between rollers 33, 35, the tape moving along the smooth surfaces of the guide channel 36, 37. During dispersing of the tape. the roller 44 is used to impress the tape 15 onto the document. Once the desired length of tape has been dispensed from the opening 29, the trigger 39 is actuated causing the blades 41, 42 to move toward each other, severing the tape 15. For the embodiment illustrated in FIG. 5, the operation is the same except that the actuator 126 is moved to advance the tape, the trigger 139 causing operation of the severing blades.

With the embodiments illustrated in FIGS. 6 and 7, one merely places the transfer sheet 52, 152 over the desired area to be highlighted, ink side down, and the areas 53, 153 are rubbed with a rubbing instrument to transfer the tone pattern of ink from the substrate 52, 152 to the document.

For the embodiment illustrated in FIGS. 8 and 9, during use the base 69 is placed over the line or lines to be highlighted. Then the upper housing 61 is moved downwardly which moves the print wheel 63 into contact with the document. The entire structure 60 is then moved horizontally parallel to the line or lines of text to be highlighted, causing the projections 68 to engage the document in a rolling action and to transfer ink to the document. Ink is supplied to the projections 68 by the roller 70, which in turn is provided ink by a felt pad in the structure 72. The area to which the ink will be applied is gauged by viewing the indicia 73 and the cut out portions 74.

For the embodiment illustrated in FIG. 13, the user merely grasps the casing body 213 in his or her hand, as one would a conventional marker, places the portion of the roller periphery extending outwardly from the opening 217 flat on a document, piece of paper, substrate or the like, so that the lines 202 engage the substrate along their entire length, and then moves the casing 213 while pressing the roller 200 into continuous contact with the substrate. The roller 200 rotates about the axis 201 defined by the stub shafts 214, and as it rotates ink is supplied from the capillaries 208, to the foam 203, and then from the foam surface 206 onto the projections 202, in a continuous manner. The wheel 200 may be rotated in either direction and the foam 203 properly and continuously applies ink to the projections 202. The notches 211 and ridges 220, 221 positively maintain the foam 203 in the proper position so that there is a slight pressure that is uniformly maintained on the wheel 200, and so that the foam 203 is always in secure, liquid transfer facilitating, engagement with the reservoir 207.

It will thus be seen that according to the present invention an effective marker for applying a tone pattern to substrates, for highlighting the substrates for subsequent electronic copying thereof, for shading them, or for other drawing/amusement purposes, has been provided that is simple yet very effective and user friendly. An effective method and other apparatus for highlighting documents has also been illustrated. While the invention has been herein shown and described in what is presently conceived to be the most practical and preferred embodiment thereof, it will be apparent to those of ordinary Skill in the art that many modifications may be made thereof within the scope of the invention, which scope is to be accorded the broadest interpretation of the appended claims so as to encompass all equivalent structures and methods.

What is claimed is:

1. A marker assembly for applying a tone to a substrate, comprising:
   an elongated hollow casing having a body portion and a removable cap at one end of the body portion; said one end of the body portion also having a projecting portion, and having means defining an opening in said projecting portion;
   a rotatable print element having tone applying projections extending radially outwardly from the peripheral surface thereof;
   means for mounting said print element for rotation and so that a portion of the peripheral surface thereof extends outwardly from said projecting portion of said casing, through said opening therein; and
   a piece of foam mounted in said casing and having a surface thereof in engagement with said print element, and extending from said print element into said casing, for applying ink to the tone applying projections on said print element, so that as said print element is moved along a substrate, a tone pattern is applied to the substrate;
   surface manifestations formed in said casing body near, but spaced from, said print element, for positively positioning said foam in said casing to fix the length of foam between said surface manifestations and said foam surface for engaging said print element;
   said foam piece comprising a parallelepiped, having first and second ends and notch means formed therein spaced from said first end thereof a first distance, slightly greater than the distance between the closest periphery of said print element and said surface manifestations; and
   wherein said surface manifestations comprise ridges dimensioned and shaped to fit in said notch means to cooperate therewith to hold the foam parallelepiped in place.

2. A marker assembly as recited in claim 1 further comprising second notch means formed in said foam on the opposite side of said notch means from said print element, and second ridges formed with said casing dimensioned and shaped to fit in said second notch means to cooperate therewith to hold the foam parallelipiped in place.

3. A marker assembly as recited in claim 1 further comprising a relatively rigid ink reservoir element mounted in said casing on the opposite side of said foam parallelipiped from said print element, and wherein said foam parallelipiped is significantly compressed between said notch means and said reservoir element without the compression affecting the pressure exerted by the foam on said print element.

4. A marker assembly as recited in claim 1 wherein said means for mounting said print element for rotating mounts said print element for rotation about a fixed axis, and wherein said notch means and ridges are generally transverse to said fixed axis.

5. A marker assembly as recited in claim 1 wherein said means for mounting said print element for rotating mounts said print element for rotation about a fixed axis, and wherein said notch means and ridges are generally parallel to said fixed axis.

6. A marker assembly as recited in claim 1 wherein said casing is formed from two substantially identical halves each having an open face for cooperating with the open face of the other half, and a closed face opposite the open face, said ridges formed in both halves and slanting inwardly, toward each other, from said open face toward said closed face.

7. A marker assembly for applying a tone to a substrate, comprising:
   an elongated hollow casing having a body portion and a removable cap at one end of the body portion; said one end of the body portion also having a projecting portion, and having means defining an opening in said projecting portion;
   a rotatable print element, comprising a print wheel, having tone applying projections extending radially outwardly from the peripheral surface thereof;
   means for mounting said print element for rotation about a fixed axis and so that a portion of the peripheral surface thereof extends outwardly from said projecting portion of said casing, through said opening therein; and
   a piece of foam mounted in said casing and having a surface thereof in engagement with said print element, and extending from said print element into said casing for applying ink to the tone applying projections on said print element, so that as said print element is moved along a substrate, a tone pattern is applied to the substrate, said piece of foam comprising a parallelepiped having a first end, at which said print wheel engaging surface is disposed, and a second end remote from said print wheel; and
   a relatively rigid ink reservoir element engaging said second end to transfer ink to said foam, said relatively rigid ink reservoir comprising a plurality of capillaries extending in a direction perpendicular to said axis, and having ink therein, said capillaries disposed within a tube of ink impervious material.

8. A marker assembly for applying a tone to a substrate, comprising:
   an elongated hollow casing having a body portion and a removable cap at one end of the body portion; said one end of the body portion also having a projecting portion, and having means defining an opening in said projecting portion;
   a rotatable print element, comprising a print wheel, having tone applying projections extending radially outwardly from the peripheral surface thereof;
   means for mounting said print element for rotation about a fixed axis and so that a portion of the peripheral surface thereof extends outwardly from said projecting portion of said casing, through said opening therein;
   said tone applying projections on said print wheel comprising lines parallel to said axis of rotation;
   a piece of foam mounted in said casing and having a surface thereof in engagement with said print element, and extending from said print element into said casing, for applying ink to the tone applying projections on said print element, so that as said print element is moved along a substrate, a tone pattern is applied to the substrate; and
   surface manifestations formed in said casing body near, but spaced from, said print element, for positively positioning said foam in said casing to fix the length of foam between said surface manifestations and said foam surface for engaging said print element; and wherein said foam piece is a parallelepiped, having first and second ends and has notch means formed therein spaced from said first end thereof a first distance, slightly greater than the distance between the closest periphery of said print element and said surface manifestations; and wherein said surface manifestations comprise ridges dimensioned and shaped to fit in said notch means to cooperate therewith to hold the foam parallelepiped in place; and wherein said notch means and ridges are at an angle with respect to said print wheel so that said surface engaging the print wheel engages more than one tone applying line at a time so that there is no noticeable flapping sound during rotation of the print wheel on a substrate.

9. A marker assembly for applying ink to a substrate, comprising:

an elongated hollow casing having a body portion and a removable cap at one end of the body portion; said one end of the body portion also having a projecting portion, and having means defining an opening in said projecting portion, and a relatively rigid ink reservoir element mounted in said casing opposite said opening;

a roller with a peripheral surface;

means for mounting said roller for rotation and so that a portion of the peripheral surface thereof extends outwardly from said projecting portion of said casing, through said opening therein;

a parallelepiped piece of foam mounted in said casing and having a surface thereof in engagement with said roller, and extending from said roller into operative contact with said reservoir element, for applying ink to the roller; and surface manifestations formed in said casing body near, but spaced from, said roller, for positively positioning said foam in said casing to fix the length of foam between said surface manifestations and said foam surface engaging said roller so that said parallelepiped piece of foam is significantly compressed between said surface manifestations and said reservoir element without the compression affecting the pressure exerted by the foam on said roller.

10. A marker assembly as recited in claim 9 wherein said foam has a firmness of about 10-12.

* * * * *